United States Patent
Franz et al.

(10) Patent No.: US 10,233,812 B2
(45) Date of Patent: Mar. 19, 2019

(54) METHOD FOR THE DIAGNOSIS OF AN SCR CATALYST SYSTEM OF AN INTERNAL COMBUSTION ENGINE

(71) Applicant: Robert Bosch GmbH, Stuttgart (DE)

(72) Inventors: Alexander Franz, Gaertringen (DE); Cornelia Nagel, Stuttgart (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 15/345,672

(22) Filed: Nov. 8, 2016

(65) Prior Publication Data

US 2017/0130637 A1 May 11, 2017

(30) Foreign Application Priority Data

Nov. 9, 2015 (DE) .................. 10 2015 221 945

(51) Int. Cl.
*F01N 11/00* (2006.01)
*F01N 3/20* (2006.01)

(52) U.S. Cl.
CPC ............. *F01N 11/00* (2013.01); *F01N 3/208* (2013.01); *F01N 2900/0408* (2013.01); *F01N 2900/0411* (2013.01); *F01N 2900/16* (2013.01)

(58) Field of Classification Search
CPC ..... F01N 3/208; F01N 13/009; F01N 13/0093
See application file for complete search history.

(56) References Cited

U.S. PATENT DOCUMENTS

| 2010/0326051 A1 | 12/2010 | Busch et al. |
| 2013/0202506 A1 | 8/2013 | Pfister et al. |
| 2015/0096287 A1* | 4/2015 | Qi .................. F01N 3/208 60/286 |

FOREIGN PATENT DOCUMENTS

| DE | 102007040439 | 3/2009 |
| DE | 102012201749 | 8/2013 |
| DE | 102013203578 | 9/2014 |
| DE | 102013203580 | 9/2014 |

* cited by examiner

*Primary Examiner* — Jonathan Matthias
(74) *Attorney, Agent, or Firm* — Michael Best & Friedrich LLP

(57) ABSTRACT

In a method for diagnosing an SCR catalyst system of an internal combustion engine, the SCR catalyst system comprises at least one first SCR catalyst device (20) and at least one second SCR catalyst device (30). A first injection position upstream of the first SCR catalyst device (20) in the form of a first metering device (40) is provided for injecting liquid reducing agent for the SCR catalyst devices (20, 30). A second injection position between the two SCR catalyst devices (20, 30) in the form of a second metering device (50) is furthermore provided. Both SCR catalyst devices (20, 30) are monitored in a differentiated way by means of active and passive diagnostic methods.

14 Claims, 2 Drawing Sheets

METHOD FOR THE DIAGNOSIS OF AN SCR CATALYST SYSTEM OF AN INTERNAL COMBUSTION ENGINE

BACKGROUND OF THE INVENTION

The present invention relates to a method for diagnosing an SCR catalyst system of an internal combustion engine, wherein the SCR catalyst system comprises at least one first SCR catalyst device and at least one second SCR catalyst device. The invention furthermore relates to an SCR catalyst system which is designed to carry out the diagnostic method, and to a computer program, a machine-readable storage medium and an electronic control unit, which are provided for carrying out the diagnostic method.

In order to comply with the legally prescribed exhaust gas limits during the operation of motor vehicles, complex exhaust gas aftertreatment systems are used. In the context of "onboard diagnosis" (OBD), stricter laws in the field of diagnosing components relevant to emissions require monitoring of all the exhaust gas aftertreatment components and of the sensors used in respect of compliance with the OBD limits, which are generally specified as a multiple of the legally defined emissions limit.

SCR catalysts (Selective Catalytic Reduction) for reducing nitrogen oxides (NOx) are known. The basic principle of the SCR catalyst consists in that nitrogen oxide molecules are reduced to elementary nitrogen on the catalyst surface in the presence of ammonia ($NH_3$) as a reducing agent. The required reducing agent, e.g. in the form of an aqueous urea solution, is injected into the exhaust line upstream of the SCR catalyst in a manner dependent on requirements. The required metering quantity is generally determined in an electronic control unit, in which optimized strategies for the operation and monitoring of the SCR system are stored.

Currently known SCR catalysts store $NH_3$ on the catalyst surface. The $NH_3$ stored on the catalyst surface is described as the $NH_3$ filling level. DE 10 2007 040 439 A1 describes a monitoring strategy in which the $NH_3$ storage capacity of the SCR catalyst is analyzed as an indicator of aging or damage of the catalyst, wherein a phase involving super stoichiometric reducing agent metering (overmetering) and an emptying test are carried out and the $NH_3$ storage capacity is inferred from characteristic values which represent the nitrogen oxide conversion rate. DE 10 2012 201 749 A1 discloses a modification of this method for diagnosing storage capacity, wherein conditioning of the SCR catalyst is carried out before the start of diagnosis or the overmetering phase in order to establish an operating point in the form of a particular $NH_3$ filling level as a starting point for diagnosis.

To achieve higher conversion rates during nitrogen oxide reduction in the exhaust line, there are already known systems which comprise two separate SCR catalyst devices arranged in series. German Laid-Open Applications DE 10 2013 203 580 A1 and DE 10 2013 203 578 A1 describe monitoring methods for exhaust gas aftertreatment systems having two SCR catalyst devices.

SUMMARY OF THE INVENTION

The diagnostic method according to the invention starts from an SCR catalyst system which comprises at least one first SCR catalyst device and at least one second SCR catalyst device. In this case, the first SCR catalyst device is situated closer to the internal combustion engine than the second SCR catalyst device. The two SCR catalyst devices are connected in series. To inject liquid reducing agent for the SCR catalyst devices, a first injection position is provided upstream of the first catalyst device in the form of a first metering device. A second injection position is provided upstream of the second SCR catalyst device and simultaneously downstream of the first SCR catalyst device, i.e. between the first and second SCR catalyst devices, in the form of a second metering device. According to the invention, both SCR catalyst devices are monitored in a differentiated way by means of active and passive diagnostic methods. Thus, passive and active diagnosis are split between the two SCR catalyst devices. Here, differentiated monitoring of the two SCR catalyst devices by means of active and passive diagnostic methods means that one of the two catalyst devices is monitored by means of an active diagnostic method and one of the two catalyst devices is monitored by means of a passive diagnostic method. In this case, both catalyst devices can be monitored in succession, alternately or simultaneously. This makes it possible to reduce the effect of emissions in the diagnosis of the overall SCR catalyst system and furthermore to improve the frequency of diagnosis (IUMPR—legally prescribed calculation of frequency of diagnosis). Moreover, it is possible with the diagnostic method according to the invention to perform differentiated monitoring, especially of the second SCR catalyst device.

The passive diagnostic method preferably does not affect reducing agent metering in the standard mode of exhaust gas aftertreatment. The active diagnostic method is distinguished by the fact that there is intervention in the metering strategy. In the sense according to the invention, a passive diagnostic method should here be taken to mean, in particular, a diagnostic method in which carrying out said method has substantially no effect on the nitrogen oxide emissions of the respective SCR catalyst device. The resolution of passive diagnosis is generally lower than that of active diagnosis. However, in carrying out the active diagnostic method, there may be an effect on nitrogen oxide emissions in respect of the individual SCR catalyst device, wherein, in particular, undermetering generally leads to an increase in nitrogen oxide emissions. The particular advantage of the method according to the invention is that, by virtue of the deliberate splitting of active and passive diagnosis between the two SCR catalyst devices, this effect on emissions does not extend to the outside in respect of the overall system.

In the sense according to the invention, a passive diagnostic method, in comparison with the active diagnostic method, can furthermore also be understood to mean a diagnostic method which has a smaller effect on nitrogen oxide emissions than the active diagnostic method. In this embodiment of the method according to the invention, therefore, the passive diagnostic method can also intervene in the metering strategy. However, the effect on emissions in this case is less pronounced than with active diagnosis. According to the invention, the active and the passive diagnostic method in this embodiment too are applied in such a differentiated way to the two SCR catalyst devices that the effect on emissions in respect of the overall system remains as small as possible, wherein the diagnostic method with the greater effect on emissions is preferably applied to the first SCR catalyst device.

The active diagnostic method, in particular, can be based on analysis of the $NH_3$ storage capacity of the respective SCR catalyst device. In this storage capacity diagnosis, the $NH_3$ filling level of the respective SCR catalyst device can be deliberately shifted upwards (overmetering) or downwards (undermetering, emptying) by means of a corresponding metering strategy, and the conversion rate during the shift is measured. In this way, the $NH_3$ storage capacity can be assessed indirectly in a manner known per se. In the passive diagnostic method, the conversion rate during operation under feedback control is preferably determined or measured without an intervention in the metering strategy. The measured values required for diagnosis can be detected using $NOx/NH_3$ sensors, which are arranged upstream and downstream of the respective SCR catalyst device, for example.

In a particularly preferred embodiment of the diagnostic method according to the invention, the active diagnosis is distinguished from the passive diagnostic method in that, before diagnosis in the narrower sense, a conditioning phase is carried out, wherein a defined starting point is established for diagnosis. The conditioning phase is, in particular, a phase involving undermetering of reducing agent. To establish the defined starting point for diagnosis, a substoichiometric metering of reducing agent can, for example, be performed during the conditioning phase until the nitrogen oxide conversion rate of the respective SCR catalyst device is below the nitrogen oxide conversion rate which would be expected in the case of normal metering. The subsequent diagnosis in the narrower sense can be performed, for example, by carrying out a phase with overmetering of reducing agent until the maximum $NH_3$ storage capacity of the SCR catalyst device is reached. The reaching of the maximum $NH_3$ storage capacity can be detected by means of the occurrence of $NH_3$ slip, for example. This is followed by a phase with undermetering of reducing agent (emptying test), wherein evaluation is performed by means of characteristic values which are dependent on the nitrogen oxide conversion rate. From this, it is possible to infer the $NH_3$ storage capacity of the SCR catalyst device and hence any aging or damage of the SCR catalyst that may be present.

In a particularly advantageous embodiment of the method according to the invention, the first SCR catalyst device is monitored by means of an active diagnostic method. Here, the active diagnostic method for the first SCR catalyst device is preferably started only if the second SCR catalyst device can be operated with a nitrogen oxide conversion or nitrogen oxide conversion rate above a predeterminable threshold. This means, therefore, that active diagnosis of the first SCR catalyst device is started, in particular, only if the second SCR catalyst device can be operated with high nitrogen oxide conversion and, in the process, can completely or partially convert the higher NOx mass flow which occurs in some circumstances downstream of the first SCR catalyst device owing to the active diagnosis performed there. The effect on emissions of active diagnosis, in relation to the overall system, is thereby eliminated or at least reduced.

It is furthermore particularly preferred that the second SCR catalyst device is monitored by means of a passive diagnostic method. It is expedient here if the passive diagnostic method for the second SCR catalyst device is started only if the second SCR catalyst device can be operated in a feedforward or feedback control mode (feedback control of the level). To supply the second SCR catalyst device with reducing agent, the second metering device is advantageously activated here. The metering devices are advantageously controllable metering devices.

In addition to the particular advantage that the effect on emissions of the active diagnostic method, which is applied to the first SCR catalyst device, is reduced overall in relation to the system, the method according to the invention additionally has the advantage that the frequency of diagnosis can be increased since active diagnosis of the first SCR catalyst device can in principle be carried out in each driving cycle. The diagnostic method according to the invention is therefore no longer restricted to a combination of passive and active diagnosis for error debouncing. This was the case with conventional diagnostic methods, in which active diagnosis was generally not started in each driving cycle but only when a suspicion of a fault had been expressed previously in a diagnostic method (passive diagnosis) that did not change the emissions. However, this did lengthen the time required for a complete diagnosis in the case of conventional methods. In the method according to the invention, the performance of active diagnosis is not restricted to the case where there is a suspicion of a fault. As a result, the frequency of diagnosis can be increased. Another disadvantage with previous diagnostic methods was that the second SCR catalyst device could generally be monitored only with difficulty. With the method according to the invention, the second SCR catalyst device can also be monitored in a robust manner.

In implementing the SCR catalyst system, a distinction is to be drawn in principle between two cases as regards the control of the two metering devices. In the first case, it is not possible to actuate both metering devices simultaneously since they are supplied by a common pump, for example. In the other case, which is admittedly technically more complex, both metering devices can be operated independently of one another. In the first case, it is necessary to switch between the individual metering devices for the normal operation of the SCR catalyst system and also for carrying out the diagnostic method according to the invention. In the second case, switching over is not necessary since control can be carried out in parallel for the two metering devices. Particularly in the second case, it is possible for the active diagnostic method on the first SCR catalyst device and the passive diagnostic method on the second SCR catalyst device to run in parallel.

Particularly in the case where the two metering devices of the SCR catalyst system cannot be actuated simultaneously, the diagnostic method according to the invention can be carried out in such a way that, at the beginning of an operating cycle of the internal combustion engine, reducing agent injection takes place via the first metering device, until the second SCR catalyst device has reached a temperature sufficient for operation with a nitrogen oxide conversion or a nitrogen oxide conversion rate above a predeterminable threshold. In this first phase, the first SCR catalyst device thus bears the main emissions load since the first SCR catalyst device is closer to the internal combustion engine and reaches the required temperature (light off temperature) more quickly than the second SCR catalyst device owing to the more rapid heating associated therewith. It is expedient here if only the first metering device is activated at the beginning of a driving cycle to enable the $NH_3$ filling level in the first SCR catalyst device to be regulated. As soon as the second SCR catalyst device has reached the required sufficient temperature (light off temperature), the main emissions load can be born substantially by the second SCR catalyst device alone, given appropriate system design with an adequate catalyst size. As soon as this is the case, it is possible to switch over to the second metering device, with the result that the injection of reducing agent then takes place only via the second metering device. During this process, filling level control in the second SCR catalyst device is expedient deactivated. This has the result that the first SCR catalyst device is no longer supplied with reducing agent. As a result, the first SCR catalyst device is then automatically emptied. In accordance with the diagnostic method according to the invention, this represents the conditioning phase for the first SCR catalyst device, which is carried out for the active diagnostic method. As soon as the setpoint filling level in the second SCR catalyst device has been established, the passive diagnostic method for the second SCR catalyst device is preferably started. After a positive conclusion of the passive diagnostic method for the second SCR catalyst device, the system preferably switches back to the first metering device, and a phase involving overmetering of reducing agent for the first SCR catalyst device is started as part of the active diagnostic method, provided the conditioning phase in the first SCR catalyst device, i.e. the setting of a predeterminable operating point, is already complete. Before the system switches back to the first metering device, there can preferably be a test as a precondition as to whether the operating conditions, in particular the catalyst temperature, permit high nitrogen oxide conversion by means of the first SCR catalyst device. Switching back to the first metering device can furthermore take place when the operating conditions in the second SCR catalyst device, in particular the catalyst temperature there, no longer permit high nitrogen oxide conversion by means of the second SCR catalyst device. When the conditions for further diagnosis of the first SCR catalyst device are not met, the normal metering strategy can be used as a fallback strategy.

The procedure is preferably repeated until monitoring of the first and of the second SCR catalyst device has been successfully concluded. It is then possible to switch over to a normal mode.

If both metering devices can be activated independently of one another and, in particular, can also be activated simultaneously, switching over is eliminated and both SCR catalyst devices can be operated under parallel control. As a result, it is also possible to carry out the passive diagnosis in the second SCR catalyst device and the active diagnosis in the first SCR catalyst device independently of one another. This has special advantages for the duration of diagnosis, in particular.

The diagnostic method according to the invention is not restricted to the specifically described embodiment of the respective active and passive diagnosis. On the contrary, the monitoring strategy can be applied in principle to all active diagnoses which include partial or complete emptying of the first SCR catalyst device. If diagnosis begins with overmetering, for example, and an emptying test is then carried out, one possibility is to wait until the emptying test is started before switching over to the second metering device, even if the second SCR catalyst device would have been able to provide high nitrogen oxide conversion even before that time under feedback control.

Given the situation that not every driving cycle proceeds in the same way and the time until the required temperature (light off) is reached by the second SCR catalyst device can vary in length, it is possible to select the active monitoring strategy in such a way that the strategy chosen is always one which promises the minimum duration of diagnosis and the smallest effect on emissions under the respective conditions. The above-explained particularly preferred switchover strategy, for the case where emptying is carried out first and then filling, is suitable particularly for cases in which the second SCR catalyst device reaches its light off temperature quickly. If observation of the temperature variation in the exhaust system leads to the recognition that the warm-up phase is taking a relatively long time in the current driving cycle, the preference may be in some circumstances to select an overmetering phase first and then to select the emptying test and initially to start the overmetering phase for the first SCR catalyst device while the second SCR catalyst device is still being heated up. On conclusion of the overmetering phase, the first SCR catalyst device would then have a high $NH_3$ excess relative to the setpoint filling level. If the system then switches to the second SCR catalyst device and to the second metering device in order to empty the first SCR catalyst device and simultaneously to start passive diagnosis for the second SCR catalyst device, the first SCR catalyst device could thus take over the main emissions load for a certain time using the $NH_3$ excess present there.

The invention furthermore comprises an SCR catalyst system for an internal combustion engine, wherein the SCR catalyst system comprises at least one first catalyst device and at least one second SCR catalyst device. To inject liquid reducing agent, at least two metering devices are provided in the manner described above. According to the invention, this SCR catalyst system is designed to carry out the diagnostic method described above. The first SCR catalyst device can be an SCR-coated particulate filter (SCRF) and the second SCR catalyst device can be a conventional SCR catalyst, for example. As regards further features of this SCR catalyst system and of the diagnostic method, attention is drawn to the above description.

The invention furthermore comprises a computer program, which is designed to carry out the steps of the diagnostic method according to the invention described. The invention furthermore comprises a machine-readable storage medium, on which a computer program of this kind is stored, and an electronic control unit, which is designed to carry out the steps of the method. Implementing the method according to the invention as a computer program and/or as a machine-readable storage medium or as an electronic control unit has the particular advantage that the diagnostic method according to the invention can thus also be used, for example, in existing motor vehicles which have an SCR catalyst system comprising two SCR catalyst devices and two metering devices for the reducing agent.

BRIEF DESCRIPTION OF THE DRAWINGS

Further features and advantages of the invention will become apparent from the following description of illustrative embodiments in conjunction with the drawings. Here, the individual features can each be implemented independently or in combination.

In the drawings.

DETAILED DESCRIPTION

Figure 1:
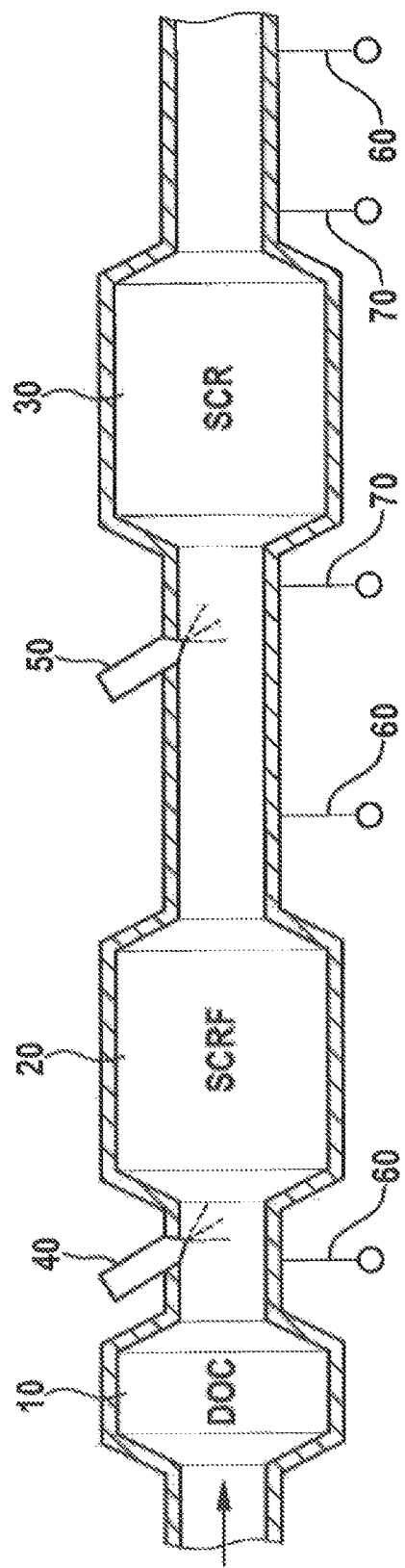
FIG. 1 shows a schematic illustration of an illustrative embodiment of an SCR catalyst system suitable for carrying out the diagnostic method according to the invention.

FIG. 1 shows schematically an illustrative structure of an SCR catalyst system suitable for carrying out the diagnostic method according to the invention. It shows the exhaust line of an internal combustion engine (not shown specifically), through which the exhaust gas flows in the direction of the arrow. The exhaust gas aftertreatment system comprises a diesel oxidation catalyst (DOC) 10. Following this, there is an SCR-coated particulate filter (SCRF) 20 as a first SCR catalyst device. Further downstream there is an SCR catalyst (SCR) 30 as a second SCR catalyst device, downstream of which there can be a further clean-up catalyst (CuC) (not shown here). Between the DOC 10 and the SCRF 20 there is a first metering device 40 for the required liquid reducing agent solution (e.g. AdBlue®). Thus, this metering device 40 is upstream of the SCRF 20. Downstream of the SCRF 20 and simultaneously upstream of the SCR 30 there is a second metering device 50 for the liquid reducing agent solution. The metering devices 40 and 50 can be conventional metering valves or injectors. A plurality of nitrogen oxide sensors 60 and temperature sensors 70, the signals of which can be used, in particular, for controlling exhaust gas aftertreatment, is furthermore provided. The performance of the diagnostic method according to the invention is not restricted to an arrangement of this kind. In principle, the invention can also be used in other exhaust gas aftertreatment systems, as long as at least two SCR catalyst devices are provided, to each of which at least one (controllable) metering device for reducing agent is assigned. The system can be configured in such a way that the two metering devices 40, 50 can be operated independently of one another or, in a solution which can be implemented at lower cost, cannot be actuated simultaneously and are supplied, for example, by a common pump. Starting from conventional systems with just one common metering device, only a single additional injector or the like (metering device) having a line with a T-piece is required here. In this case, the decision as to which of the two metering devices is used for injection is expediently taken by a control program.

The diagnostic method according to the invention can be carried out in such a way, for example, that the first SCR catalyst device 20 in the SCR catalyst system bears the main emissions load at the beginning of a driving cycle since it is closer to the engine and hence reaches its light off temperature more quickly than the second SCR catalyst device 30. At the beginning of the driving cycle, therefore, only the first metering device 40 is activated to enable the $NH_3$ filling level in the first SCR catalyst device 20 to be controlled. Even if the second SCR catalyst device 30 has reached its light off temperature, the second SCR catalyst device 30 can bear the main emissions load independently, given appropriate system design. As soon as this point in time is identified, the system switches to the second metering device 50, and filling level control is activated in the second SCR catalyst device 30. As a result, the first SCR catalyst device 20 is automatically emptied, bringing about conditioning in the sense of active diagnosis for the first SCR catalyst device 20. As soon as the $NH_3$ filling level has been successfully set to the setpoint filling level in the second SCR catalyst device 30, passive diagnosis is started for the second SCR catalyst device.

The system can switch back to the first metering device 40 when the conditions in the first SCR catalyst device 20, in particular the catalyst temperature, permit high nitrogen oxide conversion by means of the first SCR catalyst device 20 and one of the following conditions is satisfied:

passive diagnosis has been successfully concluded in the second SCR catalyst device 30 and the conditions for successful conditioning in the first SCR catalyst device 20 are satisfied;

the conditions in the second SCR catalyst device 30, in particular the catalyst temperature, no longer permit high nitrogen oxide conversion by means of the second SCR catalyst device 30.

If the system has switched back to the first metering device 40, the overmetering phase is started as part of active diagnosis in the first SCR catalyst device 20 if the conditions for successful conditioning of the first SCR catalyst device 20 have already been satisfied. Otherwise, it is possible to have recourse to the normal metering strategy.

The procedure can be repeated until monitoring of the two SCR catalyst devices 20, 30 has been successfully completed. A normal metering strategy and switchover strategy between the two metering devices 40, 50 can then be used.

In the case where both metering devices 40, 50 can be activated simultaneously, switching over is not necessary and the control operations for both states (injection via metering device 40, injection via metering device 50) are carried out in parallel, i.e. both catalyst devices 20, 30 can be operated with parallel feedback control. This results in the advantage that passive diagnosis of the second SCR catalyst device 30 can also be carried out independently of the conditioning of the first SCR catalyst device 20. Moreover, the overmetering phase in the first SCR catalyst device 20 can be started as soon as the conditions for successful conditioning of the first SCR catalyst device 20 are present. This means that it is not necessary to wait for the conclusion of passive diagnosis of the second SCR catalyst device 30. Depending on the progress of the driving cycle, this can result in further advantages for the duration of diagnosis.

Figure 2:
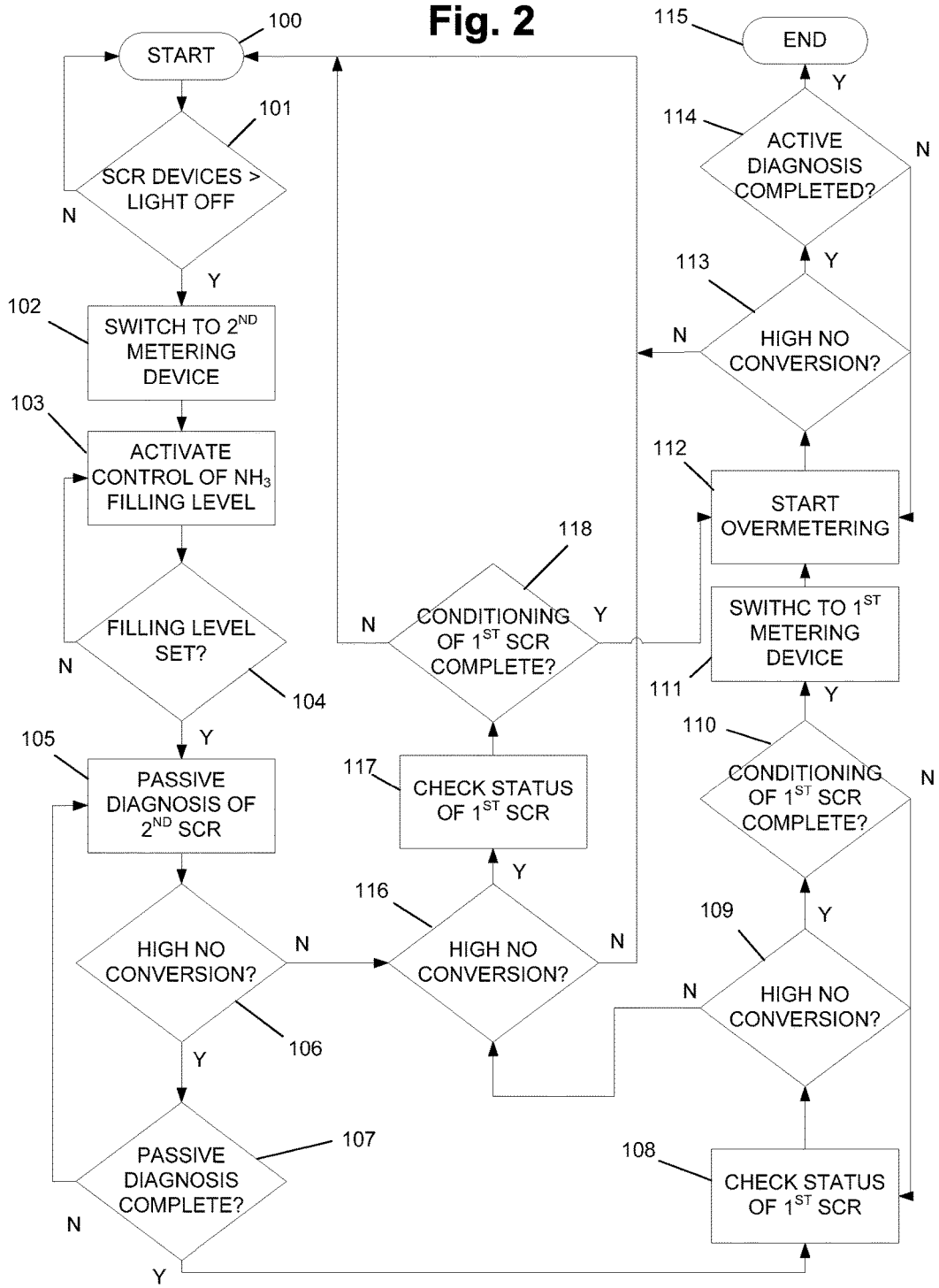
FIG. 2 shows a schematic flow chart of an illustrative embodiment of the diagnostic method according to the invention.

An illustrative sequence of the diagnostic method according to the invention is described with reference to FIG. 2, said sequence being based on an SCR catalyst system in which the two metering devices cannot be actuated simultaneously. After the start 100 of the method, the reducing agent is injected via the first metering device 40. In step 101, the system checks whether the first SCR catalyst device 20 and the second SCR catalyst device 30 have reached or exceeded their respective light off temperatures. If the answer to the enquiry in step 101 is negative, the system returns to the start 100. If the answer in step 101 is positive, the system switches over to the second metering device 50 in step 102. In step 103, control of the $NH_3$ filling level in the second SCR catalyst device 30 is activated. In step 104, the system enquires whether the $NH_3$ setpoint filling level in the second SCR catalyst device 30 has been set successfully. If this is not the case, the system returns to step 103. If the enquiry in step 104 is positive, passive diagnosis of the second SCR catalyst device 30 is carried out in step 105 by methods known per se. In step 106, the system enquires whether the conditions for high nitrogen oxide conversion by means of the second SCR catalyst device 30 are present. If this is the case, it checks in step 107 whether passive diagnosis of the second SCR catalyst device 30 has been completed. If this is not the case, it loops back to step 105. If the enquiry in step 107 is positive, the conditioning status of the first SCR catalyst device 20 (preconditioning phase with undermetering to establish a defined starting point for diagnosis) is checked in step 108. In step 109, the system enquires whether the conditions for high nitrogen oxide conversion by means of the second SCR catalyst device are present. If this is the case, it enquires in step 110 whether conditioning of the first SCR catalyst device 20 has been completed. If this is not the case, it loops back to step 108. If the enquiry in step 110 is positive, the system switches over to the first metering device 40 in step 111. In step 112, active diagnosis of the first SCR catalyst device 20 is continued with the start of an overmetering phase, for example. In step 113, the system enquires whether the conditions for high nitrogen oxide conversion by means of the second SCR catalyst device are present. If this is the case, it enquires in step 114 whether active diagnosis has been completed. If this enquiry is negative, it loops back to step 112. If the enquiry in step 114 shows that active diagnosis has been completed, the method is ended in step 115. If the enquiry in step 113 shows that the conditions for high nitrogen oxide conversion by means of the second SCR catalyst device are not present, the system loops back to the start 100.

If the enquiry in step 106 shows that the conditions for high nitrogen oxide conversion by means of the second SCR catalyst device 30 are not present, the system enquires in step 116 whether the conditions for high nitrogen oxide conversion by means of the first SCR catalyst device 20 are present. If this is the case, the conditioning status of the first SCR catalyst device 20 is checked in step 117. In step 118, the system enquires whether the conditioning of the first SCR catalyst device 20 has been completed. If this is the case, it jumps to step 112. If this is not the case, it loops back to the start of the method 100. If the enquiry in step 116 shows that the conditions for high nitrogen oxide conversion by means of the first SCR catalyst device are not present, the system loops back to the start 100. If the enquiry in step 109 shows that the conditions for high nitrogen oxide conversion by means of the second SCR catalyst device 30 are not present, the system jumps to the enquiry in step 116.

The invention claimed is:

1. A method operating an SCR catalyst system of an internal combustion engine, wherein the SCR catalyst system includes at least one first SCR catalyst device (20), at least one second SCR catalyst device (30), a first metering device (40) positioned at a first injection position upstream of the first SCR catalyst device (20), and a second metering device (50) positioned at a second injection position upstream of the second SCR catalyst device (30) and downstream of the first SCR catalyst device (20), the first and second metering devices (40, 50) injecting liquid reducing agent for the SCR catalyst devices (20, 30), the method comprising:
controlling one of the at least one first SCR catalyst device (20) and the at least one second catalyst device (40) using active diagnostic methods wherein overmetering and/or undermetering is performed based on a storage capacity of the SCR catalyst devices; and
controlling the other of the at least one first SCR catalyst device (20) and the at least one second catalyst device (40) using passive diagnostic methods.

2. The method according to claim 1, wherein there is intervention of the metering of the liquid reagent for diagnostic purposes in the case of the active diagnostic method, in contrast to the passive diagnostic method.

3. The method according to claim 1, wherein, in carrying out the passive diagnostic method, there is no effect on nitrogen oxide emissions in respect of the individual SCR catalyst device (20, 30) and in that, in carrying out the active diagnostic method, there may be an effect on nitrogen oxide emissions in respect of the individual SCR catalyst device (20, 30).

4. The method according to claim 1, wherein, in the active diagnostic method in contrast to the passive diagnostic method, a conditioning phase, involving undermetering of reducing agent, is carried out in advance in order to establish a defined starting point for diagnosis.

5. The method according to claim 4, wherein, at the beginning of an operating cycle of the internal combustion engine, there is an injection of reducing agent by the first metering device (40) until the second SCR catalyst device (30) has reached a temperature sufficient for operation with a nitrogen oxide conversion or nitrogen oxide conversion rate above a predeterminable threshold, whereupon the injection of reducing agent takes place via the second metering device (50) and the conditioning phase for the first SCR catalyst device (20) for the active diagnostic method is thereby performed.

6. The method according to claim 5, wherein the passive diagnostic method for the second SCR catalyst device (30) is started after a setpoint filling level has been set in the second SCR catalyst device (30).

7. The method according to claim 6, wherein, after a positive conclusion of the passive diagnostic method for the second SCR catalyst device (30), a phase involving overmetering of reducing agent for the first SCR catalyst device (20) by injecting reducing agent via the first metering device (40) is started to carry out diagnosis, provided the conditioning phase in the first SCR catalyst device (20) is complete.

8. The method according to claim 1, wherein the first SCR catalyst device (20) is monitored by an active diagnostic method.

9. The method according to claim 8, wherein the active diagnostic method for the first SCR catalyst device (20) is started only if the second SCR catalyst device (30) can be operated with a nitrogen oxide conversion or nitrogen oxide conversion rate above a predeterminable threshold.

10. The method according to claim 1, wherein the second SCR catalyst device (30) is monitored by a passive diagnostic method.

11. The method according to claim 10, wherein the passive diagnostic method for the second SCR catalyst device (30) is started only if the second SCR catalyst device (30) can be operated in a feedforward or feedback control mode.

12. A SCR catalyst system for an internal combustion engine, wherein the SCR catalyst system comprises at least one first SCR catalyst device (20) and at least one second SCR catalyst device (30), wherein a first metering device (40) upstream of the first SCR catalyst device (20) and a second metering device (50) upstream of the second SCR catalyst device (30) and simultaneously downstream of the first SCR catalyst device (20) are provided for injecting liquid reducing agent for the SCR catalyst devices (20, 30), characterized in that the SCR catalyst system includes an electronic control unit configured to carry out the steps of the method according to claim 1.

13. A non-transitory machine-readable storage medium, on which a computer program is stored, which, when executed on an electronic control unit, carries out the step of a method according to claim 1.

14. An electronic control unit, configured to carry out the steps of a method according to claim 1.

* * * * *